United States Patent [19]

Imamura et al.

[11] 4,214,058

[45] Jul. 22, 1980

[54] VULCANIZABLE RUBBER COMPOSITION CONTAINING METAL ORGANIC COMPOUNDS

[75] Inventors: Takaaki Imamura, Akigawa; Takahiro Kawagoe, Tokorozawa; Toshio Chikaraishi, Akigawa; Takashi Nyomura, Kodaira, all of Japan

[73] Assignee: Bridgestone Tire Company, Tokyo, Japan

[21] Appl. No.: 842,995

[22] Filed: Oct. 17, 1977

[30] Foreign Application Priority Data

Oct. 20, 1976 [JP] Japan ................... 51-125031

[51] Int. Cl.² .................... C08C 19/26; C08C 19/20; C08F 36/04
[52] U.S. Cl. ................... 525/348; 260/775; 260/785; 260/786; 427/388.2; 525/349; 525/352; 525/354; 525/334
[58] Field of Search ............. 265/775, 785, 786; 525/348, 349, 352, 354

[56] References Cited

U.S. PATENT DOCUMENTS

| | | | |
|---|---|---|---|
| 2,582,795 | 1/1952 | Prentiss | 260/79.5 B |
| 3,322,802 | 5/1967 | Brooks | 260/79.5 B |
| 3,419,589 | 12/1968 | Larson | 260/793 |
| 3,647,739 | 3/1972 | Kay | 260/33.6 UA |
| 3,904,591 | 9/1975 | Fischer | 260/79.5 B |
| 4,026,878 | 5/1977 | Kageyama | 260/79.5 P |
| 4,057,529 | 11/1977 | Leo | 260/45.75 F |

FOREIGN PATENT DOCUMENTS

| | | | |
|---|---|---|---|
| 958623 | 5/1964 | United Kingdom | 260/783 |
| 1122528 | 8/1968 | United Kingdom | 260/775 |

*Primary Examiner*—C. A. Henderson
*Attorney, Agent, or Firm*—Sughrue, Rothwell, Mion, Zinn and Macpeak

[57] ABSTRACT

A vulcanizable rubber composition having an excellent adhesive property when vulcanized in contact with metals is obtained by compounding
(a) 100 parts by weight of a raw rubber
(b) from 0.5 to 10 parts by weight of a vulcanizing agent, and
(c) from 0.01 to 1 part by weight (as metal content) of at least one metal compound selected from the class consisting of organic acid salts of titanium and molybdenum and organic complex compounds of titanium, molybdenum and cobalt.

The vulcanizable rubber composition thus obtained is not susceptible to the oxidative deterioration in unvulcanized state during the storage.

14 Claims, 1 Drawing Figure

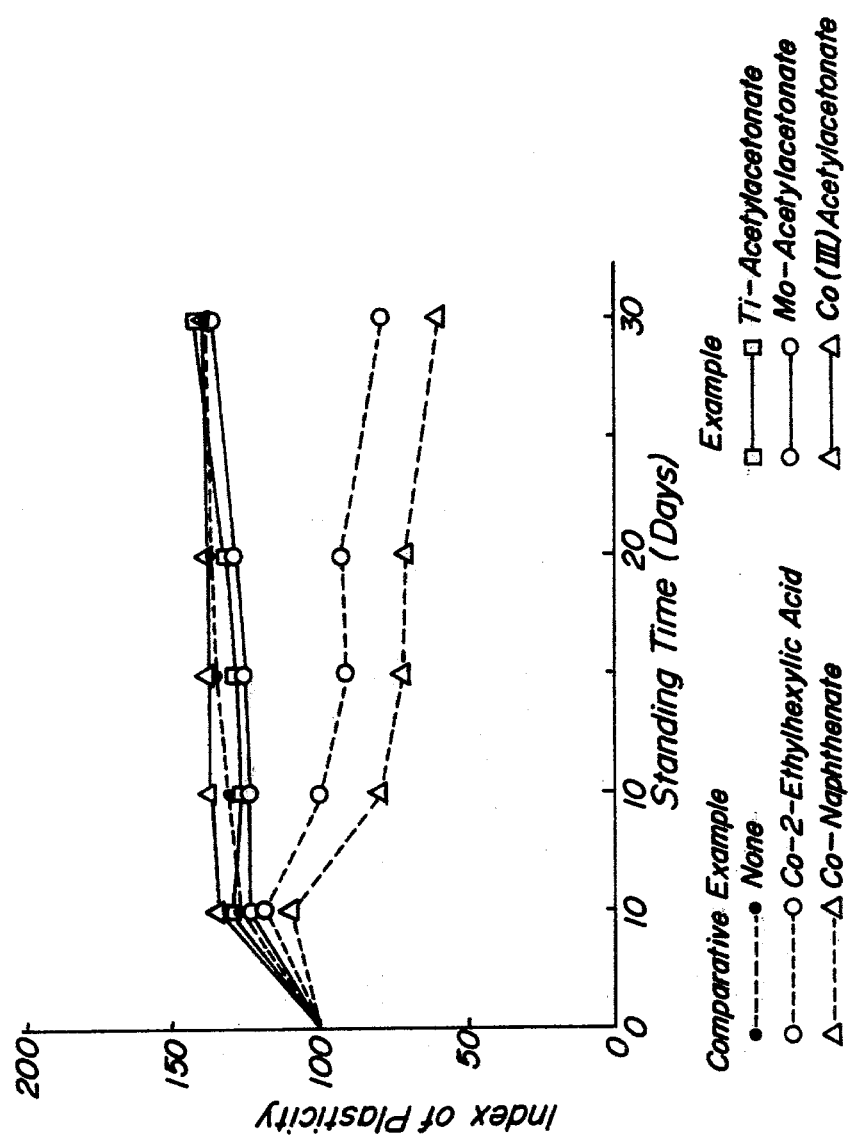

VULCANIZABLE RUBBER COMPOSITION CONTAINING METAL ORGANIC COMPOUNDS

BACKGROUND OF THE INVENTION

1. Field of the Invention

The present invention relates to a vulcanizable rubber composition having an excellent adhesive property when vulcanized in contact with metals.

2. Description of the Prior Art

In the production of metal reinforced rubber articles, such as steel cord tire, belt or hose, and metal-rubber composite articles, such as rubber vibration insulator, resilient mounting or rubber crawler, it has been earnestly desired that the adhesion between rubber and metal should be secure as strong as possible.

The efficiency and the like of said rubber articles depend on the degree of adhesion, so that the adhesion between rubber and metal is recognized fundamentally as an important problem to the production of said metal reinforced rubber articles or metal-rubber composites.

Recently, steel cord tires have been widely used as high speed durable tires and the problem described above has become important.

Conventional methods for adhesion between rubber and metal are classified in two groups. The one method involves bonding a vulcanized rubber composition to metal materials by using some kinds of adhesives and the other method involves pressing an unvulcanized rubber composition on metal surfaces under thermal condition in order to complete both of the adhesion and the vulcanization at the same time.

The latter method has been widely applied because it is simple and useful and has an advantage of not requiring any complicated steps, such as adhesive coating step and drying step. Further, in said method, various improvements have been made for practical usage.

As an embodiment, in the rubber article to endure the repeated dynamic strain, such as steel cord tire, the surface of a metallic material, such as cord or beed wire, is plated with copper-alloy, such as brass or bronze, and thereafter an unvulcanized rubber composition containing sulfur is pressed under thermal condition to form a chemical bond between the rubber composition and copper-alloy through sulfur.

However, the adhesion strength is not satisfied and is not necessarily sufficient for the usage described above.

Another known method involves incorporating an organic acid salt of cobalt, such as cobalt naphthenate, cobalt stearate and the like, into the unvulcanized rubber composition to improve the adhesion strength. However, according to this conventional method, the rubber composition incorporated with a cobalt compound is deteriorated oxidatively in unvulcanized state or even in vulcanized state.

Especially, in the condition of unvulcanized state, the oxidative deterioration of the rubber composition is remarkable and for example, the rubber stock, such as natural rubber or polyisoprene, becomes soft and sticky on its surface within one or two weeks.

Accordingly, the unvulcanized rubber composition containing an organic acid salt of cobalt is limited in the storage period until the vulcanization, so that it is impossible to send such a rubber composition to the overseas factories.

SUMMARY OF THE INVENTION

The present invention, provides a vulcanizable rubber composition having an excellent adhesive property when vulcanized in contact with metals which is obtained by compounding (a) 100 parts by weight of a raw rubber (b) from 0.5 to 10 parts by weight of a vulcanizing agent and (c) from 0.01 to 1 part by weight (as metal content) of at least one metal compound selected from the class consisting of organic acid salts of titanium and molybdenum and organic complex compounds of titanium, molybdenum and cobalt.

It is an object of the present invention to provide a rubber composition having excellent adhesion property to metal materials.

It is another object of the present invention to provide a rubber composition which has a resistance to oxidative deterioration in unvulcanized state during the storage.

The rubber composition according to the present invention is easy to use even when said composition is stored in unvulcanized state, so that it is useful for the production of the various metal-reinforced rubber articles, such as tire, belt, hose, rubber vibration insulator, resilient mounting and rubber crawler.

BRIEF DESCRIPTION OF THE DRAWING

The FIGURE shows the correlation between the index of plasticity of the rubber composition in unvulcanized state which is shown in Examples or Comparative Examples and the standing time (days) at room temperature.

DESCRIPTION OF THE PREFERRED EMBODIMENTS

A raw rubber to be used in the present invention as the component (a) is sulfur curable natural or synthetic rubber.

Typical examples of the raw rubber are natural rubber (NR); polyisoprene rubber (IR); polybutadiene rubber (BR); polychloroprene rubber (CR); styrene-butadiene copolymer rubber (SBR); isoprene-isobutylene copolymer rubber (IIR) and its halogenated rubber (Cl-IIR, Br-IIR); ethylene-propylene-diene copolymer rubber, such as ethylene-propylene-cyclopentadiene terpolymer, ethylene-propylene-5-ethylidene-norbornene terpolymer, ethylene-propylene-1,4-hexadiene terpolymer, butadiene-propylene copolymer rubber, butadiene-ethylene copolymer rubber, butadiene-isoprene copolymer, polypentenamer and their mixtures.

Among them, natural rubber (NR), polyisoprene rubber (IR), polybutadiene rubber (BR), styrene-butadiene copolymer rubber (SBR) and their mixtures are commercially available and give preferable results.

A vulcanizing agent to be used in the present invention as the component (b), is sulfur or sulfur containing vulcanizing agent.

Typical sulfur containing vulcanizing agents may be morpholine disulfide, 2-(4′-morpholinodithio)benzothiazole and thiuram compounds, such as tetramethylthiuram disulfide, tetraethylthiuram disulfide and dipentamethylenethiuram tetrasulfide.

These vulcanizing agents are used alone or in admixture. Among them, sulfur is preferably used.

The amount of the component (b) to be used in the present invention is from 0.5 to 10 parts by weight to 100 parts by weight of a raw rubber.

A metal compound to be used in the present invention as the component (c) is at least one selected from the class consisting of organic acid salts of titanium and molybdenum and organic complex compounds of titanium, molybdenum and cobalt.

These compounds are especially selected in view of the fact that the rubber composition formed is not susceptible to oxidative deterioration and further has the excellent adhesive property to metals.

The organic acids to form a titanium or molybdenum salt of the component (c) are selected from the class consisting of aliphatic carboxylic acids, alicyclic carboxylic acids and aromatic carboxylic acids.

As aliphatic carboxylic acids, mention may be made of saturated or unsaturated carboxylic acids, such as formic acid, acetic acid, propionic acid, n- or iso-butyric acid, n- or iso-valeric acid, neopentanoic acid, n- or iso-caproic acid, enanthic acid, caprylic acid, 2-ethylhexylic acid, pelargonic acid, capric acid, neodecanoic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid, acrylic acid, methacrylic acid, crotonic acid, iso-crotonic acid, undecylenic acid, oleic acid, elaidic acid, cetoleic acid, erucic acid, brassylic acid, sorbic acid, linolic acid, linolenic acid, arachidonic acid, propiolic acid, stearolic acid, oxalic acid, succinic acid, adipic acid and cetolic acid.

As alicyclic carboxylic acids, mention may be made of naphthenic acids, such as cyclobutane carboxylic acid, cyclopentane carboxylic acid, cyclohexane carboxylic acid and the like; petroleum acid; resin acids such as abietic acid and pimaric acid, rosin acid, tall oil acid.

As aromatic carboxylic acids, mention may be made of benzoic acid, toluic acid, naphthoic acid, cinnamic acid, hydro-cinnamic acid and phthalic acid.

The organic complex compounds of titanium, molybdenum and cobalt include titanyl acetylacetonate, bis-tris(acetylacetonato)titanium(IV).hexachlorotitanate(IV), molybdenyl acetylacetonate, molybdenum(III) acetylacetonate, cobalt(II) acetylacetonate and cobalt(III) acetylacetonate.

Among them, it is preferable to use aliphatic carboxylic acid salt of titanium or molybdenum, alicyclic carboxylic acid salt of titanium or molybdenum and the above described organic complex compounds of titanium, molybdenum or cobalt. Especially, the use of 2-ethylhexylic acid salt of titanium or molybdenum, titanium or molybdenum naphthenate, bis-tris-(acetylacetonato)titanium(IV).hexachlorotitanate(IV), titanyl acetylacetonate, molybdenyl acetylacetonate or molybdenum acetylacetonate, cobalt(II)acetylacetonate cobalt(IV)acetylacetonate is most preferable.

The amount of metal compounds [component (c)] to be used in the present invention is from 0.01 to 1, preferably from 0.1 to 0.5 part by weight as metal content to 100 parts by weight of a raw rubber.

The use of less than 0.01 part does not give satisfactory results in view of adhesion and the use of more than 1 part brings about the decrease of the physical properties of the shaped product and is not also favorable from the economical point.

The other conventional compounding agents may be suitably added to the rubber composition according to the purpose.

Such compounding agents are exemplified as reinforcing agents or fillers, such as, carbon black, white carbon, resin powder, silica, calcium carbonate, magnesium carbonate, clay and the like; accelerator; activators, such as zinc oxide, stearic acid; vulcanization inhibitor; antioxidant; crosslinking agent, such as organic peroxide; plasticizer; softening oils, such as vegetable oil, animal oil, mineral oil and the like; tackifier; peptizer; coloring agent; pigment and the like.

The metals to be adhered with the rubber composition are ordinarily copper and copper-alloy.

As copper alloy, there can be used the alloy prepared from copper and the other metal, such as zinc, tin, iron, aluminum, cromium, manganese, nickel, lead and silver. Among them, brass, bronze, nickel silver, phosphor bronze, aluminum bronze and chromium-copper are preferably used.

The other metals than copper or copper-alloy, such as iron, steel, zinc, tin and aluminum may also be used, as far as the surface of the metal is plated with copper or said copper-alloy. When using the organic complex compounds of cobalt as the metal compound (c), zinc, iron, steel, aluminum, tin and the alloy thereof may be used besides the above described metals.

The metal may be in any shape, such as plate, stripe, pipe, rod or wire.

The rubber composition according to the present invention may strongly adhere to the metal by compounding by means of ordinary processing apparatus such as roll or Bumbury's mixer, pressing the rubber composition to the metal and vulcanizing the rubber composition under the ordinary vulcanizing condition.

The vulcanization temperature may be from 100° to 200° C., preferably from 130° to 170° C. and the vulcanization time may be from several minutes to several hours, usually from 10 minutes to 90 minutes.

Example 1-9 and Comparative Example 1-5

The adhesion strength between rubber composition as shown in Table 1 and steel cord plated with brass was measured.

The specimen was prepared in such a manner that 10 steel cords per one inch (2.54 cm) width were put in parallel on the surface of an unvulcanized rubber sheet having a thickness of 4 mm and thereafter the specimen was cured by pressing at 145° C. for 30 minutes.

The adhesion strength was determined by peeling the steel cord from the specimen at the rate of 50 mm/min at peeling angle of 180°.

Table 1

| Ingredient | Weight part |
| --- | --- |
| Natural rubber | 80 |
| Polyisoprene rubber | 20 |
| Carbon black | 50 |
| Zinc oxide | 8 |
| Sulfur | 5 |
| Accelerator (sulfenamide compound) | 1 |
| Metal compound [component (c)] | 0.3 (as metal content) |

The results obtained are shown in Table 2 together with the kinds of metal compounds used in the examples.

Table 2

| Example No. | Metal compound | Adhesion strength (kg/cord) |
|---|---|---|
| 1 | Titanylacetylacetonate | 6.3 (100% cohesional failure = break at rubber phase) |
| 2 | Bis-tris(acetylacetonato) titanium(IV) . hexachloro-titanate(IV) | 9.4 (100% cohesional failure = break at rubber phase) |
| 3 | 2-ethylhexylic acid salt of titanium | 6.2 (100% cohesional failure = break at rubber phase) |
| 4 | Titanium naphthenate | 6.0 (100% cohesional failure = break at rubber phase) |
| 5 | Molybdenyl acetylacetonate | 9.5 (100% cohesional failure = break at rubber phase) |
| 6 | 2-Ethylhexylic acid salt of molybdenum | 4.0 (100% cohesional failure = break at rubber phase) |
| 7 | Molybdenum naphthenate | 4.0 (100% cohesional failure = break at rubber phase) |
| 8 | Cobalt(II) acetylacetonate | 10.4 (100% cohesional failure = break at rubber phase) |
| 9 | Cobalt(III) acetylacetonate | 6.5 (100% cohesional failure = break at rubber phase) |
| Comparative Example No. | | |
| 1 | Cobalt(II) naphthenate | 8.0 (100% cohesional failure = break at rubber phase) |
| 2 | 2-Ethylhexylic acid salt of cobalt | 6.0 (100% cohesional failure = break at rubber phase) |
| 3 | Cobalt(II) stearate | 6.4 (100% cohesional failure = break at rubber phase) |
| 4 | Cobalt(II) oleate | 5.8 (100% cohesional failure = break at rubber phase) |
| 5 | None | 3.0 (30%: cohesional failure 70%: adhesional failure) |

From the results shown in Table 2, it was concluded that the rubber composition according to the present invention adhered strongly to metal cord in similar level to the case using well known organic carboxylic acid salts of cobalt (Comparative Example 1-4) and the break was occured at all rubber phase through the cohesional failure. Whereas, the rubber composition containing no metal compound (Comparative Example 5) remained at low level and the break occured mostly at metal surface through adhesional failure (70%).

Example 10-17 and Comparative Example 6-7

In the present Examples, the tendency of the oxidative deterioration of various rubber compositions was observed on standing at room temperature in unvulcanized state. The rubber compositions as shown in Table 3 were compounded by means of Brabender and rolled to make a rubber sheet having a thickness of 0.5 mm, which was left to stand at room temperature in unvulcanized state.

Table 3

| Ingredient | Weight part |
|---|---|
| Natural rubber | 100 |
| Carbon black | 50 |
| Zinc oxide | 8 |
| Sulfur | 5 |
| Accelerator (sulfenamide compound) | 1 |
| Metal compound [component (c)] | 0.3 (as metal content) |

After leaving stand for given days at room temperature, the index of plasticity was measured for each specimen by means of Rapid Plastimeter MK-II type (made by H. W. Wallace Co., Ltd. (England)) at a temperature of 100° C. and under a load of 12.7 kg/cm$^2$.

The index of plasticity is an indication of hardness of the rubber composition. The greater the value, the harder the rubber composition is.

It is well known that a natural rubber is softened and its plasticity lowers when it is deteriorated oxidatively.

FIG. 1 illustrates the correlation between the index of plasticity for each rubber composition in unvulcanized state and the standing time (days) at room temperature.

The index of plasticity after standing for 30 days is also shown in Table 4.

The index of plasticity hereindescribed is the relative value to the value measured immediately after rolling the rubber composition, which is regarded as 100.

From the results as shown in FIG. 1 and Table 4, it was observed that the index of plasticity of the rubber composition containing no metal compound (comparative Example 6) was slightly increased with the lapse of the standing time.

This phenomenon has been ascribed to the formation of carbon gel and the cohesive force among the rubber molecules.

The index of plasticity of the rubber composition containing an organic carboxylic salt of cobalt which was well known as an adhesive, decreased remarkably with the lapse of the standing time, whereas that of the rubber composition according to the present invention was almost same as that of rubber composition containing no metal compound. Therefore, it was concluded that the oxidative deterioration did hardly occur on the rubber composition according to the present invention.

Table 4

| | Metal compound | Index of plasticity after 30 days |
|---|---|---|
| Comparative Example No. | | |
| 6 | none | 139 |
| 7 | 2-Ethylhexylic acid salt of cobalt | 80 |
| 8 | Cobalt naphthenate | 60 |
| Example No. | | |
| 10 | Titanyl acetylacetonate | 143 |
| 11 | 2-Ethylhexylic acid salt of titanium | 146 |
| 12 | Titanium naphthenate | 130 |
| 13 | Molybdenyl acetylacetonate | 135 |
| 14 | 2-Ethylhexylic acid salt of molybdenum | 134 |
| 15 | Molybdenum naphthenate | 130 |
| 16 | Cobalt(II) acetylacetonate | 134 |
| 17 | Cobalt(III) acetylacetonate | 136 |

We claim:

1. A vulcanizable rubber composition having an excellent adhesive property when vulcanized in contact with metals which comprises
   (a) 100 parts by weight of a diene type rubber
   (b) from 0.5 to 10 parts by weight of a vulcanizing agent selected from the group consisting of sulfur, morpholine disulfide, 2-(4'-morpholinodithio) benzothiazole and thiuram compounds and
   (c) from 0.01 to 1 part by weight (as metal content) of at least one metal compound selected from the class consisting of an aliphatic carboxylic acid salt, an alicyclic carboxylic acid salt and an aromatic carboxylic acid salt of titanium and molybdenum, titanyl acetylacetonate, bis-tris(acetyl-acetonate) titanium (IV), hexachlorotitanate (IV), molybdenyl acetylacetonate, and molybdenum (III) acetylacetonate.

2. The vulcanizable rubber composition as claimed in claim 1, in which the diene type rubber is a sulfur-vulcanizable natural or synthetic rubber.

3. The vulcanizable rubber composition as claimed in claim 1, in which the diene type rubber is selected from the group consisting of natural rubber, polyisoprene rubber, polybutadiene rubber, styrene-butadiene copolymer rubber and a mixture thereof.

4. The vulcanizable rubber composition as claimed in claim 1, in which the metal compound is an aliphatic carboxylic acid salt or an alicyclic carboxylic acid salt of titanium or molybdenum.

5. The vulcanizable rubber composition as claimed in claim 1, in which the vulcanizing agent is sulfur.

6. The vulcanizable rubber composition as claimed in claim 1, in which the use amount of the metal compound to be used as the component (c) is from 0.1 to 0.5 part by weight (as metal content) to 100 parts by weight of the diene type rubber.

7. The vulcanizable rubber composition as claimed in claim 4, in which the alicyclic carboxylic acid salt of titanium is titanium naphthenate.

8. The vulcanizable rubber composition as claimed in claim 4, in which the aliphatic carboxylic acid salt of titanium is titanium 2-ethylhexylate.

9. The vulcanizable rubber composition as claimed in claim 4, in which the alicyclic carboxylic acid salt of molybdenum is molybdenum naphthenate.

10. The vulcanizable rubber composition as claimed in claim 4, in which the aliphatic carboxylic acid salt of molybdenum is molybdenum 2-ethylhexylate.

11. The vulcanizable rubber composition as claimed in claim 1, in which the metal compound of titanium is titanyl acetyl-acetonate or bis-tris(acetylacetonate) titanium (IV). hexachlorotitanate (IV).

12. The vulcanizable rubber composition as claimed in claim 11, in which the metal compound of titanium is titanyl acetylacetonate.

13. The vulcanizable rubber composition as claimed in claim 1, in which the metal compound of molybdenum is molybdenum acetylacetonate or molybdenum acetylacetonate.

14. The vulcanizable rubber composition as claimed in claim 13, in which the metal compound of molybdenum is molybdenyl acetylacetonate.